United States Patent [19]

Liebon et al.

[11] Patent Number: 4,897,048

[45] Date of Patent: Jan. 30, 1990

[54] PREFABRICATED ELECTRIC DUCTING ADAPTABLE FOR SEVERAL RATED CURRENTS

[75] Inventors: Daniel Liebon, Arc-sur-Tille; Jean-Yves Teinturier, Longvic; Jean-Pierre Thierry, Arc-sur-Tille, all of France

[73] Assignee: La Telemecanique Electrique, France

[21] Appl. No.: 313,789

[22] Filed: Feb. 23, 1989

[30] Foreign Application Priority Data

Feb. 25, 1988 [FR] France ............................. 88 02285

[51] Int. Cl.$^4$ ............................................. H01R 25/16
[52] U.S. Cl. ...................................... 439/211; 439/212
[58] Field of Search ............................ 439/207–212, 439/214–216, 113, 114; 174/68.2, 99 B

[56] References Cited

U.S. PATENT DOCUMENTS 2,675,434  4/1954  Herrmann .......................... 174/99 B
3,634,810  1/1972  Pemberton ............................ 439/114
4,157,582  6/1979  Myers .................................. 439/213

FOREIGN PATENT DOCUMENTS 2227663  11/1974  France .................................. 439/212

Primary Examiner—Gary F. Paumen
Attorney, Agent, or Firm—William A. Drucker

[57] ABSTRACT

An electric ducting comprises, inside a metal protection casing in the form of a tubular conduit, a flat support which extends in the longitudinal direction of the casing, over the whole length thereof, and which is formed by extruding an electrically insulating plastic material. The support is provided with parallel grooves arranged side by side, in each of which a current conducting bar is housed flat. For the same flat grooved extruded support, the conducting bars corresponding to different current ratings have the same general U-shape whose legs and base have respectively the same outer height and the same outer width whatever the current rating, only the thickness of the U-shaped bar varying as a function of the current rating.

9 Claims, 5 Drawing Sheets

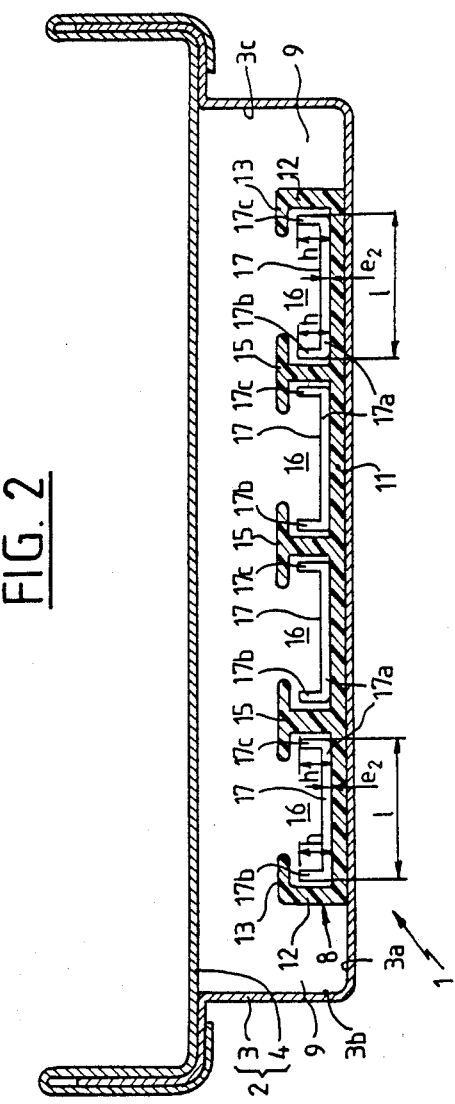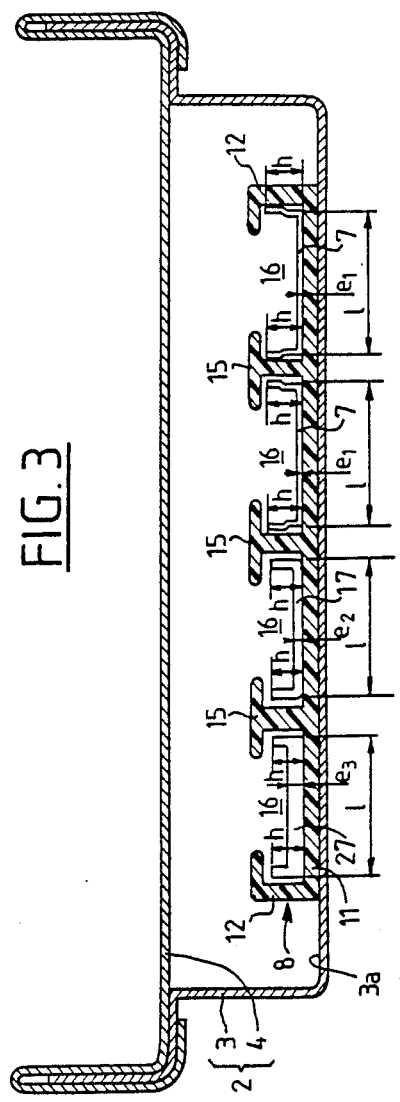

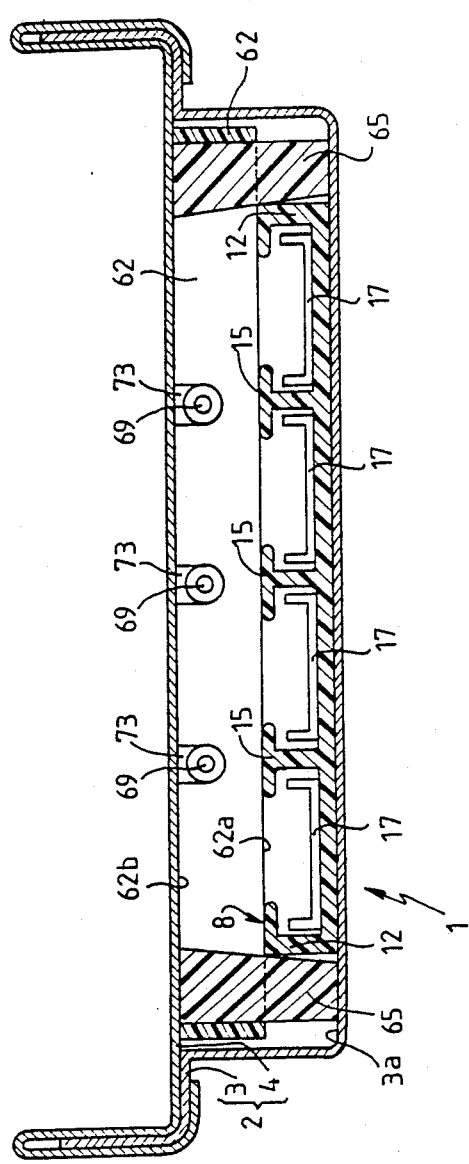
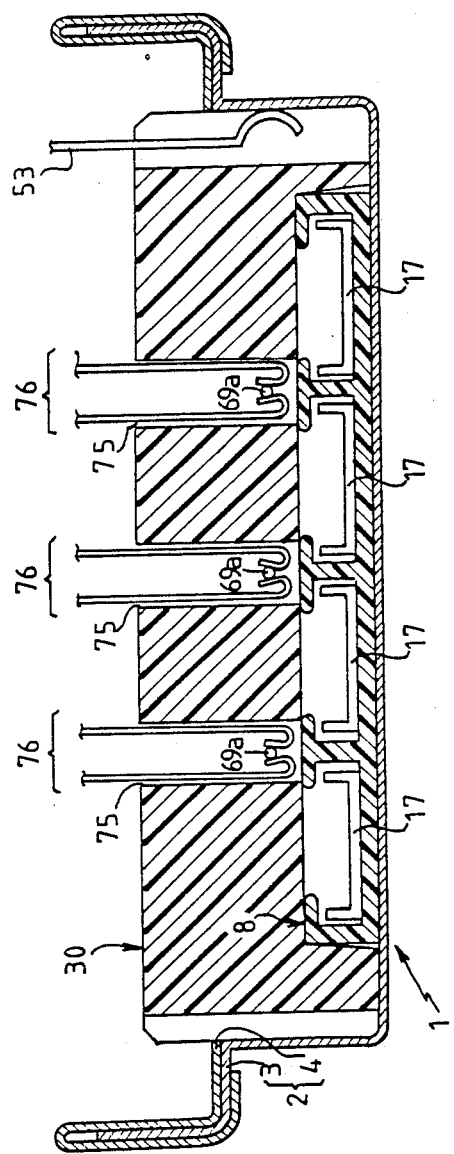
FIG. 9
FIG. 10

PREFABRICATED ELECTRIC DUCTING ADAPTABLE FOR SEVERAL RATED CURRENTS

BACKGROUND OF THE INVENTION

The present invention relates to prefabricated electric ducting adaptable for several rated currents for distributing low power, of the type comprising:

a metal protective casing in the form of a tubular conduit with an approximately parallelepipedic section, a flat support which extends longitudinally inside the casing and which is a shaped piece made by extrusion from an electrically insulating plastic material and is formed by a base plate on which are mounted two outer ribs at right angles with the base plate and, at even spacings parallel to the outer ribs, several inner ribs, these outer and inner ribs extending longitudinally over the whole length of the base plate and being shaped so as to define therebetween and with the base plate several parallel longitudinal grooves of the same C shaped section with straight edges, in each of which a current conducting bar is housed flat, this flat support having its base plate engaged against the bottom of the casing, taps spaced evenly apart over the length of the casing, each tap being provided with orifices situated opposite the conducting bars for the passage of removable current tapping members, each of the tapping members being adapted for providing an electric contact with a corresponding conducting bar.

Such an electric ducting with conductors in the form of bars disposed flat in a flat insulating grooved support is at present used for the distribution of low powers, which are usually defined as corresponding to rated ducting currents between 40 and 125 amps, the most widely used current ratings being 40A, 63A and 100A.

For supplying low power appliances, the conducting bars housed in the grooves of the insulating support of the ducting of the prior art are flat shaped pieces of rectangular shape, the section of the bars forming the phase conductors varying as a function of the rating of the ducting. Now, when it is desired to use the same flat grooved support obtained by extrusion for all the ratings of the ducting, it proves that the variations of section of the rectangular conducting bars are too great from one rating to another providing, in particular for the low ratings, a good mechanical strength of the bars when positioning them in the grooves of the support. It should also be noted that the rectangular conducting bars are usually made from copper for the above indicated ratings, which increases the cost price of the prefabricated ducting.

Furthermore, the fact of having very thick rectangular conducting bars in the grooves of the insulating support, for a given section of said bars, reduces the heat exchange surface between the bars and the external casing of the ducting, which does not allow good heat dissipation from the conducting bars.

It is an object of the present invention to overcome these drawbacks and to provide prefabricated electric ducting for low power distribution systems, which is easily adaptable to several current ratings by using particularly well shaped and dimensioned conducting bars so as to keep the same size for each of the current ratings and increase the heat exchanges.

It is another object of the invention to provide high thermal conductivity of the prefabricated ducting, for all current ratings.

SUMMARY OF THE INVENTION

According to a feature of the invention, in a prefabricated electric ducting of the above described type, for the same flat grooved support formed by extrusion, the conducting bars corresponding to the different rated currents of the ducting have the general form of a U whose legs and base have the same external height and the same external width, whatever the rated current of the ducting, only the thickness of the U-shaped bars varying as a function of the rated current of the ducting, the profile of each bar further being inscribed, with a small lateral clearance, in the same C shaped section of the different grooves of the support.

Thus, the fact of having U shaped conducting bars with constant external dimensions whatever the current rating makes it possible to use bars of the same size inside the same insulating support, for all the ratings. Furthermore, because of its U shape, the conducting bar has a heat exchange surface which is appreciably greater than that of the very thick rectangular bar of the prior art. In addition, the legs of each U shaped bar serve advantageously as a guide for fitting the bar into the corresponding groove of the support; they also offer the advantage of improving the resistance to short-circuit currents.

According to another feature of the invention, the bottom of each of the U shaped bars has, at the level of each tap and mounted at right angles thereon, a staple made from an electrically conducting material which extends in the direction of the length of the bar while projecting from the support of the conducting bars, which has in cross section approximately the shape of an $\Omega$ in which the two lateral faces of the central portion are flat and whose two side legs are fixed on the bottom of the bar, and which is adjusted in height with respect to the bottom of the bar depending on the rated current of the ducting, so as to keep the same depth dimensions for the bar-staple assembly, whatever the rated current of the ducting; each current tapping member being formed by a contact clamp clipped on to the flat lateral faces of the central portion of the corresponding staple by insertion in the corresponding orifice of the tapping point. Preferably, each U shaped conducting bar is made from aluminium, whereas each $\Omega$ shaped staple is a bi-metal piece made from copper on aluminum; each bi-metal $\Omega$ shaped staple is then fixed by its two lateral legs on the bottom of the associated aluminium bar, either by electric spot welding, or by ultrasonic welding.

Advantageously, the two flat lateral faces of the central portion of each $\Omega$ shaped bi-metal staple are at least partially coated respectively with two parallel silver layers extending over the whole length of the staple and forming respectively two localized contact areas on which the associated contact clamp is received.

According to another aspect of the invention, the ducting further has, inside the casing between two successive taps, at least one flat insulating wedge for applying the support of the conducting bars against the bottom of the casing, said wedge being inserted in bearing relation and flat between the top of the bar support and the internal face of the longitudinal wall of the casing parallel to that forming the bottom of the casing, said wedge being two lateral legs which rest on the bottom of the casing on each side of the support and are respectively in slight bearing relation on the two lateral ribs of the support of the bars, so as to allow a certain longitudinal sliding of the support during expansion of the latter.

Thus, these wedges spaced apart inside the casing of the ducting, over the whole length thereof, make it possible sufficiently to press the insulating support, and so indirectly the conducting bars, against the bottom of the casing to obtain good heat conduction of said bars.

BRIEF DESCRIPTION OF THE DRAWINGS

Other features and advantages of the invention will be made clearer from the detailed description which follows, with reference to the accompanying drawings, given solely by way of example, and in which:

FIG. 2 is a schematic sectional view on a larger scale of the ducting through line II—II of FIG. 1;

FIG. 3 is view similiar to FIG. 2, with conducting bars designed for several current ratings;

FIG. 5 is a detailed sectional view of a staple;

FIG. 6 is a perspective view of this same staple;

FIG. 9 is a cross sectional view of the ducting showing a wedge bearing on the support of the conducting bars; and FIG. 10 is a sectional view on a larger scale of the ducting through line X—X of FIG. 1, the connector being connected to the ducting.

DESCRIPTION OF THE PREFERRED EMBODIMENTS

Figure 1:
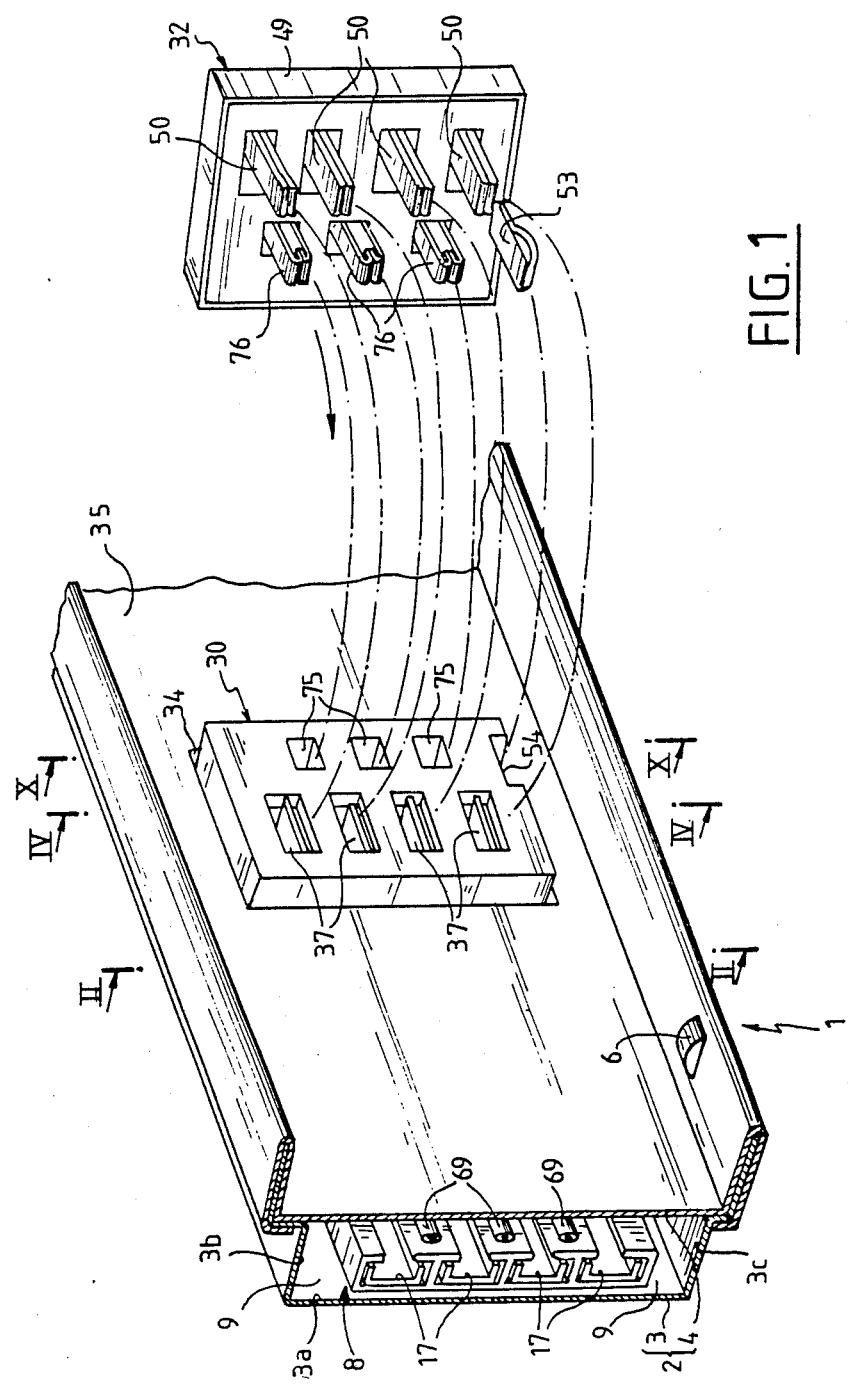
FIG. 1 is a partial perspective exploded view of the ducting of the invention and of a tapping connector, the conducting bars of the ducting being designed for a certain current rating.

In the example shown in FIGS. 1 and 2, the electric ducting 1 comprises an external rigid metal casing or sheath 2 in the form of a tubular conduit of approximately parallelepipedic section formed of a body 3 and a lid 4 joined together by any appropriate fixing system, for example by seaming.

When fixing is made by seaming, the closed casing 2 advantageously has a plurality of projecting reinforcements 6, only one of which has been illustrated in FIG. 1, distributed along the inner face of one of the side walls of the casing 2, so as to provide good torsional rigidity of the casing. Each of these reinforcements 6 is, in a way known per se, formed from seamed metal sheets of body 3 and of the lid 4 of the casing by non emergent punching.

This casing 2 is preferably made from an electrically conducting material, for example from galvanized steel sheeting, so as to be able to serve as protective conductor itself.

It should be noted that body 3 and lid 4 of the metal casing may be made from a single piece of metal sheet but shaped by rolling, the lid being bent back then fixed by its free end, for example by seaming, to the body. This one-piece construction for example by seaming, to the body. This one-piece construction of the protective casing advantageously provides better rigidity.

As shown in FIGS. 1 and 2, casing 2 comprises a flat rectangular support 8 made from an insulating material which is disposed flat on the bottom 3a of the body 3 of the casing by forming laterally a free space 9 with each of the two side edges 3b, 3c of body 3 of the casing, and which extends in the longitudinal direction of casing 2, over the whole length thereof.

This flat support 8 is a shaped piece formed by extrusion of an electrically insulating thermoplastic material. It comprises, see FIG. 2, a base plate 11 on which are mounted at right angles thereto, on the one hand, two lateral ribs 12 extended upwards by flanges 13 bent at right angles to face each other and, on the other hand, several internal T shaped ribs 15, three in particular in the disclosed embodiment, spaced apart evenly between the two lateral ribs 12 and of the same height as them. These five ribs 12, 15 are parallel, extend longitudinally over the whole length of the base plate 11 of the support, are integrally extruded therewith and define therebetween and with said base plate four longitudinal parallel grooves 16 formed side by side, of the same C cross section with straight edges, and in each of which a flat power current conducting bar 17 is housed.

The conducting bars 17 are preferably made from aluminium and are electrically insulated from each other by ribs 12, 15 of support 8.

In the embodiment shown in FIGS. 1 and 2, the conducting bars 17 are four in number and correspond to the conductors of a three phase line with neutral, the protective conductor being formed by the casing 2 itself as was mentioned above. In another embodiment, the protective conductor may be formed by a conducting bar, identical to bars 17, disposed flat in an additional groove provided in the flat insulating support.

In accordance with the invention, from the grooved insulating support 8 obtained by extrusion and intended to be used as it is for several given ratings of the ducting, the conducting bars corresponding to these ratings have the general form of a U which is inscribed in the corresponding groove 16 of support 8 and which has the feature that its legs and its base have respectively the same external height and the same external width, whatever the rating of the ducting, only its thickness varying as a function of the rating of the ducting.

In the embodiment shown in FIGS. 1 and 2, the four identical U shaped conducting bars 17 are adapted to correspond to a given rating of ducting 1 such, for example, as the rating 63A. In FIG. 2, each U shaped bar 17 has a given external height h for its two legs 17b, 17c, a given external width 1 for its web or base 17a, and a thickness designated e2 which is adjusted to correspond to the 63A rating chosen in this example. Of course, the height h and the width 1 of each U shaped bar 17 are determined so that the bar is perfectly inscribed, with a slight lateral clearance, in the corresponding C shaped groove 16 of support 8, the base 17a of the U shaped bar resting flat against the bottom of said groove 16.

In FIG. 3, the same flat grooved support 8 previously described has been shown, which is capable of receiving successively and indifferently in its grooves 16 several sets of U shaped conducting bars corresponding to different current ratings. By way of example, in FIG. 3, the four C shaped grooves 16 of support 8 may house either four bars 7, two only of which have been shown, corresponding to a first current rating such, for example, as the rating 40A, or the four above described bars 17, only one of which has been shown in FIG. 3, corresponding to a second current rating, 63A for example, or else four bars 27, only one of which has been shown, corresponding to a third current rating such, for example, as rating 100A; as mentioned above, the U shaped conducting bars 7, 17, 27 of FIG. 3 all have legs of the same external height h and a base of the same external width 1 and have different respective thicknesses e1, e2, e3 adjusted respectively depending on the three chosen current ratings, in this case, 40A, 63A and 100A.

The ducting 1 illustrated in FIG. 1 also has a plurality of taps only one of which has been illustrated at 30 in this figure, which are spaced apart evenly along the length of casing 2 and which are provided with a closure trap (not shown), the opening and closing of which are actuated by a removable tapping connector shown schematically at 32 in FIG. 1.

In this example, the tap 30 of FIG. 1 is in the form of a substantially parallelepipedic block made from an insulating material which is engaged in a transverse rectangular opening 34 formed in the longitudinal wall 35 of casing 2.

Figure 4:
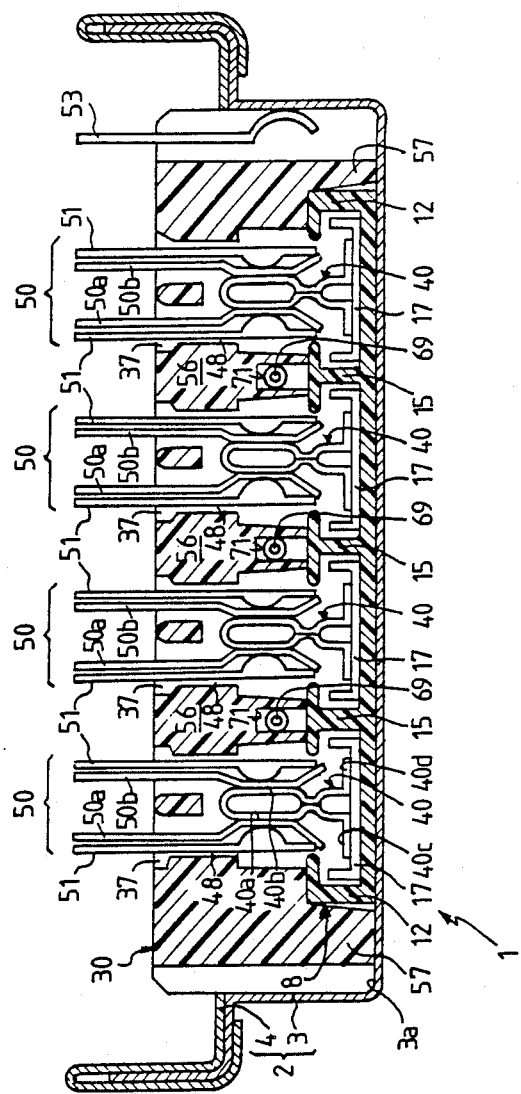
FIG. 4 is a sectional view on a larger scale of the ducting, through line IV—IV of FIG. 1, the connector being connected to the ducting.

In FIG. 4, the upper face of this block 30 comprises a first series of four aligned orifices or bores 37 situated respectively opposite the four identical U shaped conducting bars 17 and each opening on to a tapping clip or staple made from an electrically conducting material, designated by the general reference 40, mounted perpendicularly to the bottom of the corresponding U shaped bar 17 and extending in the direction of the length of the bar while projecting from the insulating support 8.

Each staple 40, see FIG. 4, has in cross section the approximate shape of an omega whose two lateral faces 40a, 40b of its central portion are flat and whose two side lugs 40c, 40d are fixed to the bottom of the corresponding U shaped bar 17 by any appropriate fixing means.

With U shaped conducting bars made from aluminium, each staple 40 is made from two metals, copper and aluminium, and is fixed by its side lugs 40c, 40d to the bottom of the associated aluminium bar 17, either by electric spot welding or by ultrasonic welding. In FIG. 5 the aluminium layer 41 and a thin copper layer 42 have been shown which form a bimetal $\Omega$ shaped staple 40.

As shown in FIG. 5, the copper layer 42 of the bimetal staple 40 is coated, over a part only of the two flat lateral faces of the central part of the $\Omega$, with two parallel silver layers 44. These two silver layers 44, see FIG. 6, extend over the whole length of staple 40 and form respectively two localized contact areas or tracks for receiving a contact clip fitted thereon.

In FIG. 6, the bi-metal $\Omega$ shaped staple 40 has, at each of its ends, two slight embossings 46 substantially provided at the basis of its central part and put into pinpoint contact so as to avoid any drawing together of the two legs of the $\Omega$ when a short circuit appears.

In the embodiment illustred in FIG. 4, the insulating block 30 comprises, in its lower part, four recesses 48 communicating respectively with the four orifices 39, extending parallel in the longitudinal direction of the conducting bars 17 and each having a between-axis distance substantially equal to that of the bars. Each of these recesses 48 serves as a housing for the central part of the corresponding $\Omega$ shaped staple 40 projecting from the insulating support 8.

In this example, connector 32 (FIG. 1) comprises a case 49 made from an insulating material from which projects a first series of four removable connection members formed by contact clips 50 engageable on the staples 40 by introducing them in the four access orifices 37 provided in the upper face of the insulating block 30, see FIG. 4. The two branches 50a, 50b of each clip 50 are applied resiliently against the silver coated side faces of the corresponding $\Omega$ shaped staple 40 and are reinforced resiliently by means of blade springs 51 (FIG. 4).

As shown in FIG. 1, the contact clips 50 are mounted in the connector 32 at positions whose lay-out corresponds to that of orifices 37; conventionally, they can only penetrate into the corresponding orifices 37 after the closure trap (not shown) has been opened by means of a control finger 53 projecting from case 49 of the connector and engaging in an aperture 54 formed in a lateral edge of the tapping block 30.

Block 30 illustrated in FIG. 4 has internal dividing walls 56, three in number in this embodiment, extending parallel in the longitudinal direction of the ducting and being applied flat on the upper face of the three internal T shaped ribs 15 of support 8, as well as two lateral lugs or legs 57 resting on the bottom 3a of the body 3 of the casing, on each side of support 8, and bearing respectively lightly against the two lateral ribs 12 of the support. These dividing walls 56 and these legs 57 of the insulating block make it possible to press support 8, and so indirectly the conducting bars 17, sufficiently against the bottom of casing 2 so as to obtain good heat conduction from said bar, while allowing a certain longitudinal sliding of the support 8 in the case of expansion thereof.

Furthermore, when the same flat grooved support 8 is used for several sets of U shaped conducting bars corresponding to different current ratings and being distinguished from each other by the fact that the thicknesses of the U shaped bars are different depending on the current ratings, as was explained above, the $\Omega$ shaped staples associated with the different bars are then adjusted in height depending on the current ratings so as to keep the same depth dimension for the bar-tapping assemblies, whatever the current rating.

Figure 7:
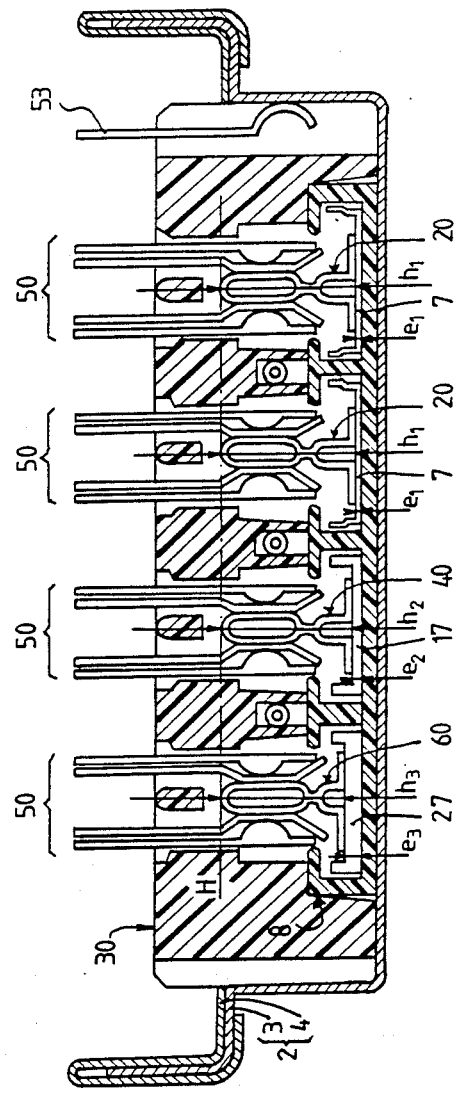
FIG. 7 is a view similar to FIG. 4, with conducting bars designed for several current ratings.

Thus, in FIG. 7 which shows the U shaped conducting bars 7, 17, 27 described above with reference to FIG. 3, these bars having different respective thicknesses, e1, e2, e3 adjusted respectively depending on the three current ratings chosen (e.g. 40A, 63A and 100A), the $\Omega$ shaped staples have been shown respectively at 20, 40, 60, associated with bars 7, 17, 27 and having different respective heights h1, h2, h3 defined as a function of the thicknesses of the respective bars so as to be all situated at the same predetermined level, referenced H.

Figure 8:
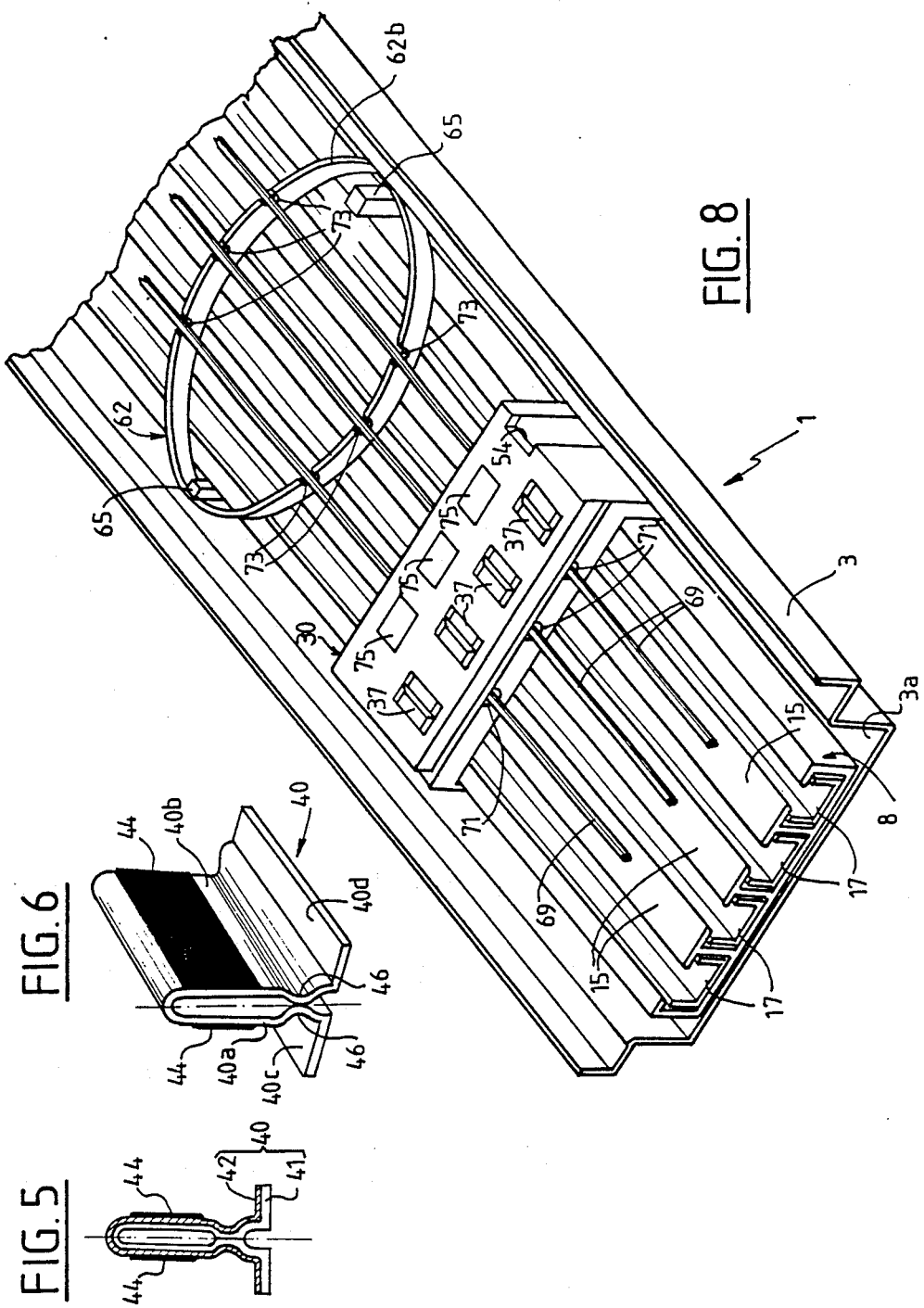
FIG. 8 is a partial perspective view of the ducting, the lid of the casing being removed.

Between two successive taps of the type shown at 30 in FIG. 1, it is anticipated to dispose inside the casing of ducting 1 flat wedges made from an insulating material, e.g. two in number, only one of which has been shown at 62 in FIG. 8, each intended to apply the support 8 of the conducting bars against the bottom 3a of the body 3 of the casing.

In this embodiment, the bearing wedge 62 of FIG. 8 has the general shape of a ring whose lower edge 62a (FIG. 9) rests on the upper face of ribs 12, 15 of support 8 and whose upper edge 62b bears against the internal face of lid 4 of casing 2 (see FIG. 9). This wedge 62 also has two lateral legs or lugs 65 resting on the bottom 3a of the body 3 of the casing, on each side of support 8, and bearing respectively slightly against the two lateral ribs 12 of the support. Similarly to the insulating block 30 described above, the insulating wedge 62 also makes it possible to press support 8, and so indirectly the conducting bars 17, sufficiently against the bottom of casing 2 so as to obtain good heat conduction of said bars, while allowing a certain longitudinal sliding of support 8 in the case of expansion thereof.

As shown in FIGS. 1, 4, 8 and 9, the ducting 1 may also house a plurality of low current insulated conductors 69, three in this embodiment, usable for remote control or remote transmission purposes.

In this embodiment, see FIG. 8, the three conductors 69 extend parallel in the longitudinal direction of the ducting while being disposed respectively above the three internal T shaped ribs 15 of support 8 of the conducting bars. These three conductors 69 pass through each tapping block 30 via three apertures 71 pierced respectively in the three internal dividing walls 56 of the block (FIG. 4). They also pass through each ring shaped wedge 62 via notches or indentations 73 in the form of a U, shown in FIG. 8, formed from the upper edge 62b of the wedge and spaced apart in three parallel pairs aligned respectively with the three apertures 71 formed in the insulating block 30.

Thus, each intermediate indented wedge 62 fixed inside the casing of the ducting serves advantageously both as a bearing piece for supporting the conducting bars against the bottom of the casing and as a support and holding piece for the insulated low current conductors.

In this example, see FIGS. 1, 8 and 10, the upper face of the tapping block 30 comprises a second series of three aligned orifices or bores 75 communicating respectively with the three openings 71 (FIG. 8) for passage of the conductors 69 and giving access to bared portions 69a (FIG. 10) of the three conductors. The case 49 of connector 32 (FIG. 1) has projecting therefrom a second series of three removable connection members formed for example by contact clips 76 cooperating with the bared portions 69a of the conductors by insertion in the three access orifices 75 provided in the upper face of the insulating block 30, see FIG. 10.

What is claimed is:

1. A prefabricated electric ducting adaptable for several given rated currents and intended in particular for distributing low powers, said ducting comprising:
   i. a metal protective casing in the form of a tubular conduit having a longitudinal axis and a substantially parallelepipedic section,
   ii. a flat support which extends longitudinally inside the casing, said support being a shaped piece made by extruding an electrically insulating plastic material and comprising a base plate, two outer ribs mounted at right angles to said base plate and, at even spacings parallel to said outer ribs, a plurality of inner ribs, said outer and inner ribs extending longitudinally over the whole length of the base plate and being shaped so as to define therebetween and with the base plate a plurality of parallel longitudinal grooves having identical C sections with straight edges, a current conducting bar housed flat in each of said grooves, said support bars being applied by its base plate against the bottom of the casing,
   iii. a plurality of taps spaced evenly apart over the length of the casing, each of said taps being provided with orifices situated opposite said conducting bars for the passage of removable current tapping members, each of said taps providing an electric contact with a corresponding conducting bar, wherein the conducting bars corresponding to said different rated currents of the ducting have the general form of a U having legs and base which have respectively identical outer heights and identical outer widths, whatever the rated current of the ducting, said U conducting bars having a thickness which varies as a function of the rated current of the ducting, the respective conducting bars being inscribed in the respective identical C shaped sections of said grooves.

2. An electric ducting as claimed in claim 1, wherein at the level of each of said taps, the bottom of each of said U-shaped conducting bars has mounted at right angles thereon a staple made from an electrically conducting material said staple extending in the direction of the length of the bar while having a projecting portion which extends from said support of the conducting bar, said staple having in cross section the approximate shape of an $\Omega$ with a central portion having two flat lateral faces and with two side legs which are fixed on the bottom of the bar, said staple being adjusted in height with respect to the bottom of the bar depending on the rated current of the ducting, so as to keep the same depth dimensions for the bar-staple assembly, whatever the rated current of the ducting, each current taping member being formed by a contact clamp clipped on to the flat lateral faces of said central portion of the corresponding $\Omega$ tap by insertion in the corresponding orifice of the tap.

3. An electric ducting as claimed in claim 2, wherein each U-shaped conducting bar is made from aluminium, whereas each $\Omega$ shaped staple is a bi-metal piece made from copper on aluminium, said bi-metal $\Omega$ shaped piece having two lateral legs which are fixed on the bottom of the associated aluminium bar.

4. An electric ducting as claimed in claim 3, wherein two flat lateral faces of the central portion of each of said $\Omega$ shaped bi-metal staple are at least partially coated respectively with two parallel silver layers extending over the whole length of said staple and forming respectively two localized contact areas on which the associated contact clamp is received.

5. An electric ducting as claimed in claim 4, wherein said casing has a bottom wall and further wall parallel to said bottom wall and each of said taps is in the form of a substantially parallelepipedic insulating block, said insulating block being engaged in a rectangular opening formed in said further wall, said insulating block having a lower face provided with a plurality of recesses, said recesses being in number equal to that of the conducting bars, and arranged side by side parallel to the bars, said recesses and said bars having the same between-axis distance and a plurality of parallel longitudinal dividing walls between said recesses, each of said recesses housing said projecting portion of the $\Omega$ staple associated with the corresponding conducting bar so that the insulating block is applied flat by said dividing walls on said ribs of the support, the insulating block having an upper face provided with an orifice and each recess communicating with said orifice provided so as to allow said contact clamp to have access to the corresponding staple.

6. An electric ducting as claimed in claim 5, wherein the insulating block has two lateral legs resting on the bottom of the casing on each side of said support, said lateral legs being in bearing relation respectively on the two outer ribs of said support so as to allow a certain longitudinal sliding of the support in the case of expansion thereof.

7. An electric ducting as claimed in claim 5, wherein said dividing walls are each formed axially with an opening serving for the passage of a low current insulated electric conductor in a direction parallel to the longitudinal axis of the casing, and the upper face of the insulating block has bores communicating respectively with said openings for the passage of the conductors, each of said bores giving access to a bared portion of the conductor adapted for receiving by engagement in the associated bore a removable electric connection member.

8. An electric ducting as claimed in claim 1, comprising, inside the casing between two successive taps, at least one flat insulating wedge for applying said support against the bottom of the casing, said support having a top portion and said casing having a bottom wall and a further wall parallel to said bottom wall, said further wall having an inner face said wedge being inserted in bearing relation and flat between said top portion of the support and said inner face, said wedge having two lateral legs resting on the bottom of the casing on each side of the support and being respectively in bearing relation on the two outer ribs of the support, so as to allow a certain longitudinal sliding of the support during expansion of the latter.

9. An electric ducting as claimed in claim 8, wherein said wedge has the general form of a ring having a lower edge which rests partially on the ribs of the support, said ring further having an upper edge which is provided with a plurality of notches, in number equal to twice that of the openings formed in the insulating block, said notches being aligned in pairs respectively with said openings in respective directions parallel to the longitudinal axis of the casing, each pair of aligned notches supporting and holding in position the low current insulated electric conductor passing through the corresponding opening of the insulating block.

* * * * *